United States Patent [19]

Lockwood et al.

[11] Patent Number: 4,585,243
[45] Date of Patent: Apr. 29, 1986

[54] SPRAY CONTROLLING VEHICLE SPLASH GUARD

[75] Inventors: James R. Lockwood, Wapakoneta; Larry A. Loeffler, Lima, both of Ohio

[73] Assignee: Lancaster Colony Corporation, Columbus, Ohio

[21] Appl. No.: 574,530
[22] Filed: Jan. 27, 1984
[51] Int. Cl.$^4$ .............................................. B62B 9/16
[52] U.S. Cl. ........................... 280/154.5 R; D12/185
[58] Field of Search .................. 280/154.5 R; 15/215, 15/217, 161; D12/185

[56] References Cited

U.S. PATENT DOCUMENTS

| D. 160,554 | 10/1950 | Sherman | 15/215 |
| 3,285,624 | 11/1966 | Aber et al. | 280/154.5 R |
| 4,068,339 | 1/1978 | Maruyama et al. | 15/215 |
| 4,258,929 | 3/1981 | Brandon et al. | 280/154.5 R |
| 4,290,619 | 9/1981 | Goodall | 280/154.5 R |

FOREIGN PATENT DOCUMENTS 1101143 1/1968 United Kingdom ......... 280/154.5 R

Primary Examiner—David M. Mitchell
Assistant Examiner—Eric D. Culbreth
Attorney, Agent, or Firm—Robert E. Stebens

[57] ABSTRACT

A splash guard for truck-type vehicles is provided having a panel including a surface adapted to be disposed in facing relationship rearwardly of the wheels in intercepting relationship to water droplets that may be thrown upwardly and rearwardly of the wheels. The panel surface is formed with a plurality of elongated ribs disposed in spaced parallel relationship and projecting from the panel surface. Each of the ribs is formed with nonplanar wall surfaces with the specific rib configuration comprising a plurality of conical projections disposed in longitudinally spaced relationship and interconnected by relatively thin wall elements to form a substantially continuous wall.

10 Claims, 4 Drawing Figures

SPRAY CONTROLLING VEHICLE SPLASH GUARD

FIELD OF THE INVENTION

This invention relates to splash guards designed primarily for use with large truck-type vehicles. It relates more specifically to a splash guard or mud flap adapted to be suspended rearwardly of a set of wheels on a truck-type vehicle for intercepting water droplets thrown by the wheels and for controlling the generation and further dispersion of water spray or mist.

BACKGROUND OF THE INVENTION

During recent years, considerable effort and money has been expended in developing splash guards or mud flaps to be utilized with large truck-type vehicles. The primary objective of these efforts is to develop a splash guard which will prevent, or at least significantly reduce, the direct dispersion onto or into the path of other vehicles of water droplets created by the vehicle's wheels when traversing wet pavements. The objective is to also attempt controlling the relatively fine mist that is consequently developed when the water droplets initially generated are intercepted by splash guards which are generally required equipment on trucks of the otherwise open wheel type, i.e. absence of protective fenders. It is the mist formed by small size water droplets that is is readily dispersed laterally of the vehicle and often attains a density sufficient to severely restrict vision of the drivers in vehicles travelling parallel to a truck-type vehicle.

An example of one previous attempt to develop a splash guard is that illustrated and described in U.S. Pat. No. 3,285,624 issued to H. S. Aber et al on Nov. 15, 1966. This patent illustrates the twofold approach of attempting to combat the problem of a splash guard sailing or floating in the airstream and thereby reducing its effectiveness as well as the problem of attempting to collect the water droplets that are thrown upwardly and rearwardly from the truck wheels. The Aber patent discloses a structure wherein a sheet-form panel of either a rubber or plastic material is formed with a plurality of vertically extending V-shaped ribs that are arranged in groups at each side of the panel. The objective of those ribs is to collect the water droplets between adjacent ribs and prevent their lateral or transverse movement and to thereby reduce the degree to which those droplets may be further dispersed in the formation of a mist of relatively small sized water droplets. The specific rib conformations disclosed in the Aber patent are smooth, planar surfaced walls which have been found to be less effective than desired in performing the functions of collecting the water droplets and preventing their dispersion in a lateral or transverse direction with respect to the splash guard.

Another example of an attempt to develop a splash guard designed to control the dispersion of water droplets is disclosed in British Pat. No. 1101143 granted to K. D. Anderson which was published Jan. 31, 1968 and based on an application which was filed Jan. 20, 1965. The structure disclosed in that patent comprised a sheet-form panel having a plurality of conically shaped projections formed on a surface of the panel and projecting outwardly therefrom. The projections were arranged in a pattern where the projections were essentially aligned in vertical rows with the projections in adjacent rows being longitudinally offset to result in the projections being located in displaced relationship as between the rows. While the providing of conical projections of this nature improved the ability and capability of a splash guard to collect water droplets that were intercepted by the guard, the effectiveness of such a guard was also found to be less than that desired in controlling the generation and dispersion of a fine mist spray. Water droplets intercepted by the panel and incident to surfaces of the projections retained a strong tendency to be deflected or diverted in a transverse direction across the surface of the panel and could move along the channels that were formed by the projections, although those channels were oriented at an angle with respect to the transverse axis of the guard. The effect was that the water droplets were dispersed and tended to travel in a general transverse direction toward the lateral sides of the guard where they could and did exit and thus travel into the path of adjacent or passing vehicles even though flanges were provided at each side to attempt containment of the laterally dispersing mist.

SUMMARY OF THE INVENTION

A spray controlling splash guard is provided by this invention having a sheet-form panel provided with conformations on one surface thereof that are highly effective in controlling the generation of spray in the form of a small size droplet mist and inhibiting the dispersion of the generated mist transversely of the panel and thereby reduce the likelihood of the mist being carried laterally of the vehicle by the air currents that are simultaneously generated by the vehicle wheels. In accordance with this invention, a sheet-form panel adapted to be suspended in a vertical plane rearwardly of a set of vehicle wheels has spray controlling conformations formed on the surface facing the wheels in the nature of elongated ribs disposed in spaced relationship and extending vertically on the surface of the panel. These ribs which are relatively spaced to each other form channels between adjacent pairs of ribs, are advantageously formed over substantially the entire surface of the panel facing the wheels and function to not only more efficiently collect the water droplet, but to more effectively retain the intercepted water droplets and prevent their dispersion, particularly in a direction transversely of the panel. Orientation of the plurality of ribs in a vertical direction results in the formation of channels which are effective in retaining the collected water and directing it in a downward direction where it is discharged from the lower edge of the panel onto the roadway surface.

In accordance with this invention, to better achieve the objective of preventing or at least minimizing the dispersion of the fine mist spray that is usually generated during the process of collecting the water droplets, the plurality of elongated ribs are advantageously configured to have nonplanar side wall surfaces. A specific embodiment of the present invention that was constructed was formed with ribs that, in effect, comprised rows of conically shaped projections interconnected by relatively thin wall elements resulting in a continuous wall structure or rib. Adjacent ribs were configured such that the conical projections in one rib were disposed in longitudinally offset relationship such that the projections of an adjacent row was located at the longitudinal midpoint of two projections in an adjacent rib. The relatively thin wall elements were formed to intersect the projections at their midpoint and were of a height essentially equal to the height of the projections. This embodiment of the invention constructed as described was tested and found to be highly efficient in collection of the water droplets and preventing their lateral dispersion. Water droplets entering a channel between two adjacent ribs impinge upon the conical projection surfaces and were then diverted in a direction longitudinally of the ribs with transverse movement essentially prevented as a consequence of the continuous wall configuration. Similarly, any mist of smaller sized droplets formed as a consequence of breaking up the larger droplets was also effectively controlled with its movement substantially confined to movement vertically between adjacent pairs of ribs.

These and other objects and advantages of the present invention will be readily apparent from the following detailed description of an illustrative embodiment thereof and the accompanying drawings.

DESCRIPTION OF THE DRAWING FIGURES

DESCRIPTION OF THE ILLUSTRATIVE EMBODIMENT

Figure 1:
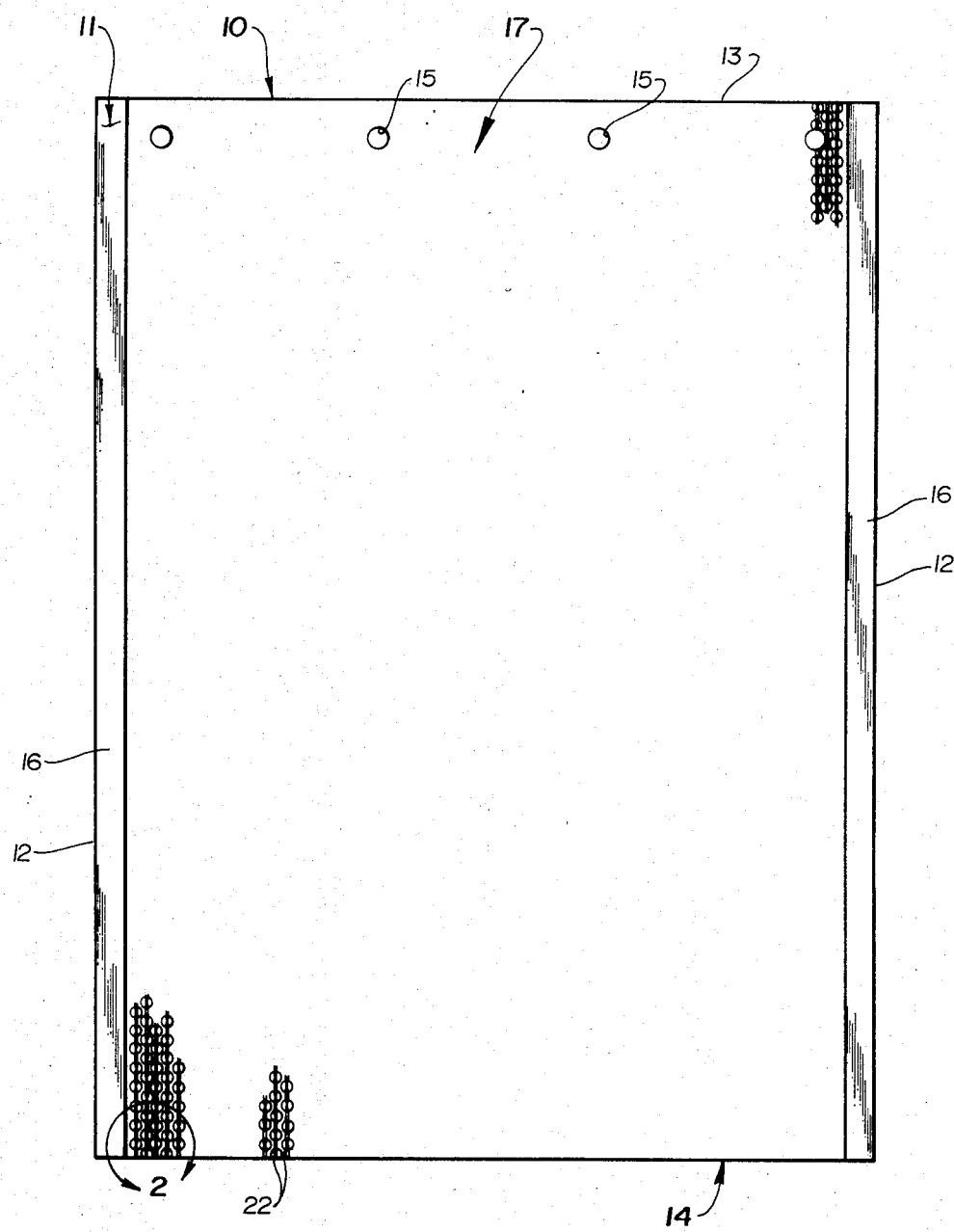
FIG. 1 is an elevational view of a splash guard showing the front surface thereof provided with spray controlling conformations formed in accordance with this invention.

Referring to FIG. 1 of the drawings, a splash guard 10 of sheet-form panel configuration is shown as viewed from a surface 11 thereof which is normally disposed in facing relationship to a wheel or set of wheels of a vehicle and in rearwardly spaced relationship thereto. The splash guard 10 is of rectangular shape having vertically extending side edges 12 and top and bottom transverse edges 13 and 14. A marginal edge portion adjacent the top transverse edge 13 may be provided with a plurality of apertures 15 disposed in transversely spaced relationship and adapted to cooperate with mounting or support devices carried by a vehicle frame and from which the splash guard is suspended in a generally vertical plane. Each vertically extending side edge 12 is also advantageously formed with a marginal edge portion 16 that is relatively thicker than the central portion 17 of the sheet-form panel. These marginal edge portions thus form reinforcing or stiffening ribs 16 extending the entire vertical length of the panel. The panel itself may be fabricated from a material such as rubber or suitable plastic material by appropriate molding or extruding processes. The ribs 16 are effective in enabling the splash guard to resist the forces of the airstream generated by a moving vehicle and tend to maintain the guard in a vertically oriented position and prevent the undesirable sail effect. If it is desired to further enhance the stiffening or rigidification of the splash guard, reinforcing elements such as spring steel rods or flat plates (not shown) may be integrally molded into these ribs 16.

The sheet-form panel 17 of the splash guard extending between the two lateral or vertical stiffening ribs 16 is defined by a front or forwardly facing surface 20 and a rearwardly facing surface 21. In this illustrative embodiment, the thickness of the panel or the spacing between the front and rear surfaces 20 and 21 is of the order of 5 millimeters and referring to FIG. 3, it will be seen that this panel thickness is about one half the thickness of the reinforcing or stiffening ribs 16. It will be understood that the proportional thickness of the panel and ribs is for purposes of illustration of one embodiment of the invention and it will be understood that these proportions may be modified in accordance with the characteristics of the particular material from which a splash guard is fabricated to achieve the desired structural strength and rigidity of the panel to resist the forces of the airstream and maintain the panel in a vertical orientation. Specific dimensioning is also a illustrative with respect to the size of the splash guard with these guards frequently having a common width of 24 inches (61 centimeters) and being made available in vertical heights of 24, 30 or 36 inches (61, 76 or 91 centimeters) to accommodate the various different sized wheels that are found on truck-type vehicles with which the splash guard is intended to be primarily utilized. Each of the stiffening ribs 16 may be of a width of the order of 25 millimeters (one inch).

Figure 2:
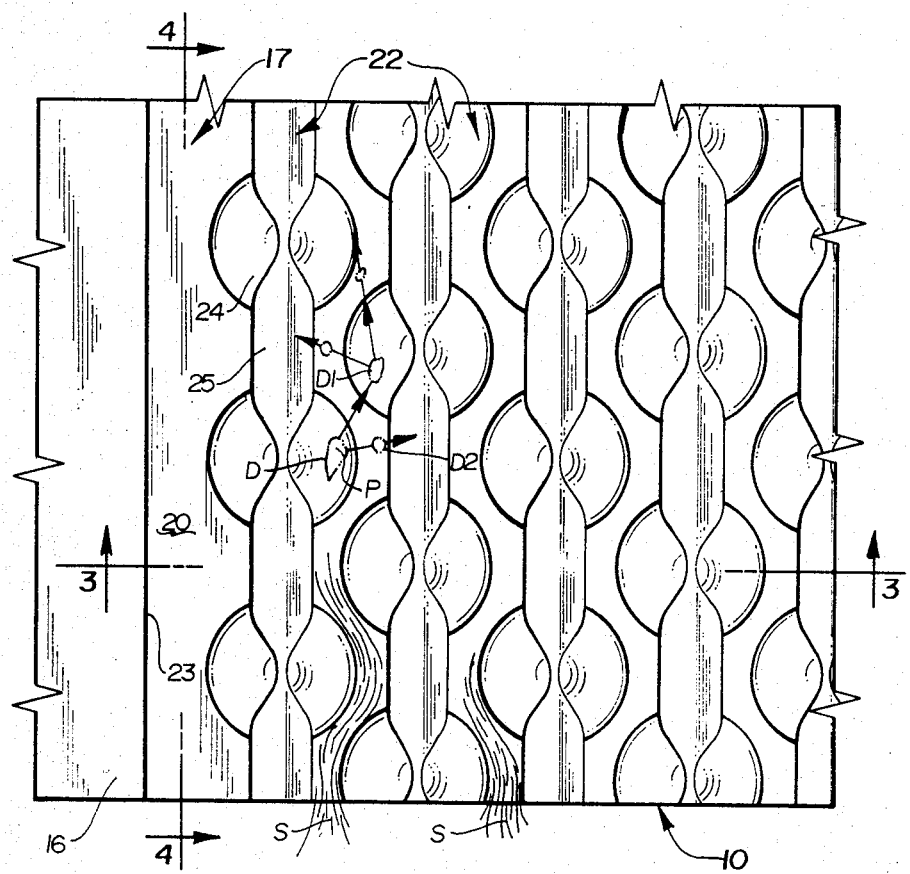
FIG. 2 is a fragmentary plan view on a substantially enlarged scale of the front surface of the panel in the region generally included within the circle identified by the line 2.
Figure 3:
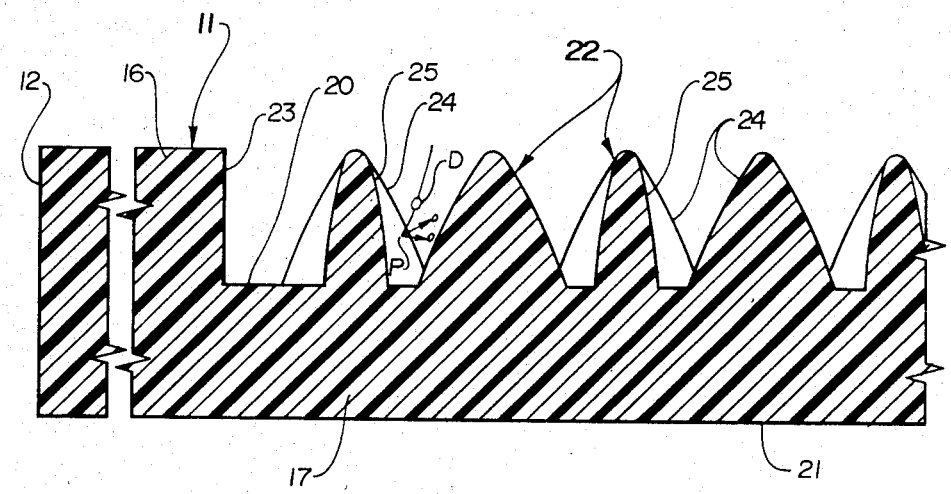
FIG. 3 is a fragmentary sectional view taken along line 3—3 of FIG. 2.
Figure 4:
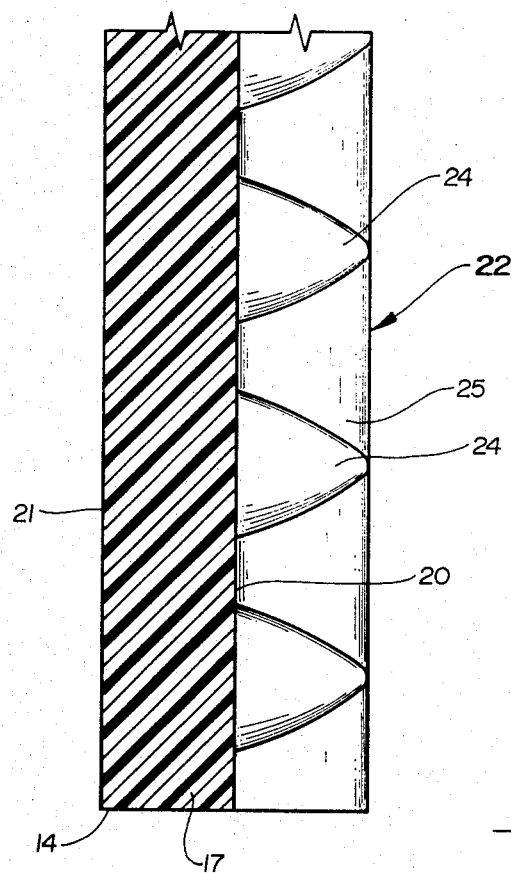
FIG. 4 is a fragmentary sectional view taken along line 4—4 of FIG. 2.

Arrangement and structural configuration of the spray controlling conformations can be best seen by reference to FIGS. 2, 3 and 4. Those drawing figures are a substantial enlargement over the actual size of the conformations in order to more clearly illustrate their configuration and arrangement as well as their function. As can be seen in these drawing figures, these conformations comprise a plurality of elongated ribs 22 which are formed on and project outwardly from the front surface 20 of the splash guard central panel 17. These ribs 22 are disposed in spaced parallel relationship and it will be noted that adjacent pairs of ribs define in cooperative relationship to each other elongated channels that are open at both the upper and lower ends and thus enable a downward flow of collected water to discharge from the panel at the bottom transverse edge 14. Fabrication of the splash guard embodying this construction may be conveniently accomplished by an extruding technique utilizing thermoplastic rubber materials. Incorporated into the extruding mechanism as a part of the forming die is a cylinder which has a surface configured to form the spray controlling conformations. Thus, by the extrusion process, the ribs 22 as well as the splash guard panel itself are formed as a continuous structure which is transversely cut to the desired length for the particular type of splash guard. Accordingly, the channels between adjacent ribs will be open at each end as well as the channel that is formed by each of the outermost ribs and the adjacent side wall 23 of the respective stiffening rib 16. Fabrication may also be accomplished by press mold techniques and apparatus as well as utilizing thermosetting materials such as either curable rubber or synthetic resins.

In this illustrative embodiment of the splash guard of this invention, each of the elongated ribs 22 is formed by a series of longitudinally spaced finger-like projections 24 that in this illustrative embodiment are of a conical configuration and interconnecting, relatively narrow wall elements 25. The conical projections 24 and wall elements 25 are of the same height and in the illustrative embodiment, have a vertical dimension of the order of five (5) millimeters. Each conical projection 24 has an illustrative base diameter of the order of five (5) millimeters and the projections are spaced approximately seven (7) millimeters apart in their respective longitudinally aligned rows as referenced to the central vertical axes of the projections. This dimensioning and relative spacing of the projections in a particular row results in the base of the projections being spaced apart approximately two (2) millimeters. Adjacent rows of projections 24 and associated wall elements 25 are spaced apart relative to their longitudinal center lines a distance of the order of 4.5 millimeters. This lateral spacing of the adjacent ribs results in a base portion of the projections in each rib being relatively overlapped with reference to a longitudinal center line between adjacent ribs and thereby preventing development of a straight line path between adjacent ribs. It will also be noted that the relative positioning of the projections in any two adjacent ribs is such that the projections are longitudinally offset by a distance of the order of one half of the spacing between adjacent projections. As can be best seen in FIG. 3, the wall elements 25 are relatively narrow as compared to the base dimension of the projections 24 and have an exemplary base thickness of the order of two (2) millimeters. Consequently, these wall elements have a relatively narrow profile with their side walls being generally vertically disposed with respect to the front surface 20 of the panel. Each of the wall elements itself is integrally formed with the adjacent projections and the projections and wall elements consequently form a continuous wall extending the length of the splash guard.

Functioning of the spray controlling conformation in collection of water droplets and preventing subsequent dispersion of the water droplets is diagrammatically illustrated in FIGS. 2 and 3. A water droplet D is indicated to have impinged upon a conical projection 24 at a specific point designated P. As a consequence of impingement, the water droplet D will likely break up into at least two smaller sized droplets such as D1 and D2 which, for purposes of illustration, may be deflected along respective paths to respectively impinge upon other surfaces such as another conical projection 24 in the adjacent rib and a surface of a wall element 25 also in the adjacent rib. Each of these secondary water droplets D1 and D2 may again be split up into two or more droplets that are of further relatively smaller size and which are diverted in different directions. As an example, the one droplet D1 is shown as having a secondary droplet of relatively smaller size travelling in a direction to impinge against another conical projection that is formed in the rib that was first contacted by the original droplet D. This action of the water droplets in contacting the projections and wall elements will result in the droplets, or the smaller droplets that are formed, being essentially and very effectively confined between two adjacent ribs 22 where they will tend to collect on the surfaces of the ribs and flow to the surface 20 and thence along that surface. The droplets and the smaller dispersions thereof are confined to a limited direction of travel that is essentially longitudinal and parallel to the ribs and will be either upwardly or downwardly directed in the channels with the ribs being highly effective in preventing transverse flow of water droplets or fine mist spray. Droplets that are directed upwardly on an initial basis will ultimately be collected on the surface 20 of the panel into a film or layer of water that then flows downwardly. The droplets collected as a water film then gravitate downwardly along the surface 20 in the direction of the bottom transverse edge 14 where the respective streams S formed between adjacent ribs 22 will exit and be discharged from the bottom of the splash guard and directed downwardly toward the road surface.

With that illustrative explanation of the functioning of the combined conical projection 24 and relatively narrow wall elements 25, it will be seen that the novel configuration of the spray controlling conformations to have what can be generally defined as nonplanar wall surfaces is highly effective in containing the intercepted water droplets and effectively reducing the generation of laterally directed spray or mist. The continuous elongated ribs 22 are particularly effective in preventing the water droplets or divisions of those droplets travelling transversely across the panel as they are immediately intercepted when rebounding from one wall by the next adjacent wall, thereby resulting in enhanced collection of the water droplets and effective minimization of generation of a mist of small water droplets that could disperse into the path of other vehicles.

While a single embodiment of the invention has been illustrated and described as fabricated with specific dimensions, it is to be understood that this is for purposes of providing a specific example of a splash guard that has been found by test to be capable of performing the desired functions. The ribs have been generally described as having nonplanar wall surfaces and it will be readily apparent that configurations other than conical projections and interconnecting wall elements may be used to form the ribs having nonplanar surfaces as between adjacent ribs and with the ribs formed as substantially continuous walls. Also, while the conical projections and wall elements are illustrated and described as having the same vertical height, there can be some departure from this desirable configuration that produces uniform effectivity over the entire surface of the splash guard.

Having thus described this invention, what is claimed is:

1. A splash guard for automotive vehicles for controlling water spray generated by the wheels when traversing a moisture covered roadway comprising
a sheet-form panel adapted to be suspended in a vertical plane from a vehicle's frame in rearwardly disposed and generally aligned relationship to a wheel thereof, said panel, when so suspended, having a vertically extending surface disposed in facing relationship to the wheel for intercepting droplets of water that may be thrown upwardly and rearwardly by the wheel and having spray controlling conformations formed on said surface for effecting a collection of water from intercepted water droplets and directing a downward flow of such collected water, said spray controlling conformations including a plurality of elongated ribs projecting outwardly from said vertically extending surface and disposed in spaced apart relationship extending generally vertically on a suspended panel, said ribs being formed with said wall surface having substantially continuous, non-planar, boundaries defined as the intersection of said side wall surfaces with said vertically extending surface that are undulated in the longitudinal direction, said side wall surface inhibiting transverse movement of water droplets incident to said side wall surfaces and vertically extending surface therebetween from between adjacent pairs of ribs and to direct such incident water droplets or dispersion thereof and water collected on said vertically extending surface generally vertically therebetween whereby water will be collected and enabled to flow downwardly between adjacent pairs of ribs to be discharged at a bottom end thereof.

2. A splash guard according to claim 1 wherein each of said elongated ribs is formed from a plurality of finger-like projections that are disposed in longitudinally spaced relationship and a plurality of elongated wall elements extending longitudinally of the rib with a wall element disposed between adjacent pairs of said projections to cooperate therewith in forming a substantially continuous rib.

3. A splash guard according to claim 2 wherein said projections are of a conical configuration with a base thereof disposed on said vertically extending surface.

4. A splash guard according to claim 2 wherein said wall elements interconnect with the adjacent projection.

5. A splash guard according to claim 2 wherein said wall elements are formed with a transverse dimension that is relatively thin with respect to the transverse dimension of said projections.

6. A splash guard according to claim 2 wherein the projections in adjacent ribs are longitudinally offset with respect to each other.

7. A splash guard according to claim 2 wherein the projections in a rib are longitudinally offset with respect to the projections in an adjacent rib to be located at substantially the midpoint between adjacent pairs of projections in the next adjacent rib.

8. A splash guard for automotive vehicles for controlling water spray generated by the wheels when traversing a moisture covered roadway comprising a sheet-form panel adapted to be suspended in a vertical plane from a vehicle's frame in rearwardly disposed and generally aligned relationship to a wheel thereof, said panel, when so suspended, having a surface disposed in vertically extending, facing relationship to the wheel for intercepting droplets of water that may be thrown upwardly and rearwardly by the wheel and having spray controlling conformations formed on said frame for effecting a collection of water from intercepted water droplets and directing a downward flow of such collected water, said spray controlling conformations including a plurality of elongated ribs projecting outwardly from said surface and disposed in spaced apart relationship extending generally vertically on a suspended panel, with each of said elongated ribs being formed from a plurality of finger-like projections that are disposed in longitudinally spaced relationship and a plurality of elongated wall elements extending longitudinally of the rib with a wall element disposed between adjacent pairs of said projections to cooperate therewith in forming a substantially continuous rib, said wall elements being formed with a transverse dimension that is relatively thin with respect to the transverse dimension of said projections, said projections being of a conical configuration with a base thereof disposed on said panel surface, said ribs being formed with substantially continuous, non-planar side wall surfaces to inhibit transverse movement of water droplets incident to said surfaces or surface of the panel therebetween from between adjacent pairs of ribs and to direct such incident water droplets or dispersion thereof and water collected on said panel surface generally vertically therebetween whereby water will be collected and enabled to flow downwardly between adjacent pairs of ribs and to be discharged at a bottom end thereof.

9. A splash guard according to claim 8 wherein said projections and wall elements are of substantially the same height.

10. A splash guard for automotive vehicles for controlling water spray generated by the wheels when traversing a moisture covered roadway comprising a sheet-form panel adapted to be suspended in a vertical plane from a vehicle's frame in rearwardly disposed and generally aligned relationship to a wheel thereof, said panel, when so suspended, having a surface disposed in vertically extending, facing relationship to the wheel for intercepting droplets of water that may be thrown upwardly and rearwardly by the wheel and having spray controlling conformations formed on said surface for effecting a collection of water from intercepted water droplets and directing a downward flow of such collected water, said spray controlling conformations including a plurality of elongated ribs projecting outwardly from said surface and disposed in spaced apart relationship extending generally vertically on a suspended panel, with each of said elongated ribs being formed from a plurality of finger-like projections that are disposed in longitudinally spaced relationship and a plurality of elongated wall elements extending longitudinally of the rib with a wall element disposed between adjacent pairs of said projections to cooperate therewith in forming a substantially continuous rib, said ribs being formed with substantially continuous, non-planar side wall surfaces to inhibit transverse movement of water droplets incident to said surfaces or surface of the panel therebetween from between adjacent pairs of ribs and to direct such incident water droplets or dispersion thereof and water collected on said panel surface generally vertically therebetween whereby water will be collected and enabled to flow downwardly between adjacent pairs of ribs and to be discharged at a bottom end thereof, said projections having a transverse base dimension that is greater than the center line spacing of adjacent pairs or ribs whereby at least base portions of projections will be overlapped in a transverse direction, said projections in adjacent ribs being longitudinally offset with respect to each other, thereby resulting in a serpentine path being formed between adjacent ribs.

* * * * *